US011176209B2

(12) United States Patent
Davis et al.

(10) Patent No.: US 11,176,209 B2
(45) Date of Patent: Nov. 16, 2021

(54) DYNAMICALLY AUGMENTING QUERY TO SEARCH FOR CONTENT NOT PREVIOUSLY KNOWN TO THE USER

(71) Applicant: International Business Machines Corporation, Armonk, NY (US)

(72) Inventors: Michael C. Davis, Tampa, FL (US); Robert S. Milligan, Erlanger, KY (US); Gordan G. Greenlee, Endicott, NY (US); Jason LaScola, Grand Rapids, MI (US); Christopher L. Molloy, Raleigh, NC (US); Steven A. Waite, Racine, WI (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/533,275

(22) Filed: Aug. 6, 2019

(65) Prior Publication Data
US 2021/0042374 A1 Feb. 11, 2021

(51) Int. Cl.
*G06F 16/9532* (2019.01)
*G06F 16/2457* (2019.01)
*G06F 16/9535* (2019.01)

(52) U.S. Cl.
CPC .... *G06F 16/9532* (2019.01); *G06F 16/24578* (2019.01); *G06F 16/9535* (2019.01)

(58) Field of Classification Search
CPC ............. G06F 16/9532; G06F 16/9535; G06F 16/24578
USPC ........................................................ 707/734
See application file for complete search history.

(56) References Cited

U.S. PATENT DOCUMENTS

| 8,312,022 B2* | 11/2012 | Wilde | G06F 16/957 |
| | | | 707/740 |
| 9,361,365 B2* | 6/2016 | Sweeney | G06F 16/367 |
| 2005/0210008 A1* | 9/2005 | Tran | G06F 16/951 |
| 2005/0210009 A1* | 9/2005 | Tran | H04L 63/08 |
| 2007/0192293 A1* | 8/2007 | Swen | G06F 16/338 |
| 2008/0104032 A1* | 5/2008 | Sarkar | G06F 16/958 |

(Continued)

OTHER PUBLICATIONS

Sharma et al., "Automatic Tagging and Retrieval of E-Commerce Products Based on Visual Features," Proceedings of NAACL-HLT, San Diego, California, Jun. 12-17, 2016, pp. 22-28.

*Primary Examiner* — Mark E Hershley
(74) *Attorney, Agent, or Firm* — Robert A. Voigt, Jr.; Winstead PC

(57) ABSTRACT

A computer-implemented method, system and computer program product for improving query searches. After receiving a query from a user to conduct a content search, the query is analyzed for its semantic meaning and a categorized group of query tags and content tags in the central repository that is most semantically similar in meaning to the meaning of the query is identified. Furthermore, the content tags and query tags in the user's repository are analyzed to determine the interests of the user. The query may then be augmented to include one or more other terms of interest from the identified categorized group of query tags and content tags in the central repository that match the determined interests of the user within a threshold degree of relatedness, where these other terms of interest correspond to the content tags and query tags of the identified categorized group based on their assigned weight.

20 Claims, 7 Drawing Sheets

(56) References Cited

U.S. PATENT DOCUMENTS

| | | | |
|---|---|---|---|
| 2008/0177994 A1* | 7/2008 | Mayer | G06F 9/4418 713/2 |
| 2010/0010987 A1* | 1/2010 | Smyth | G06F 16/9535 707/E17.014 |
| 2010/0094878 A1* | 4/2010 | Soroca | G06Q 30/02 707/748 |
| 2010/0114878 A1* | 5/2010 | Lu | G06F 16/334 707/723 |
| 2010/0228693 A1* | 9/2010 | Dawson | G06F 16/322 706/12 |
| 2010/0306249 A1* | 12/2010 | Hill | G06Q 50/01 707/769 |
| 2011/0258049 A1* | 10/2011 | Ramer | G06Q 30/0273 705/14.66 |
| 2011/0314006 A1* | 12/2011 | Sweeney | G06Q 30/0277 707/723 |
| 2012/0005148 A1* | 1/2012 | Horvitz | G06F 16/337 706/50 |
| 2012/0150874 A1* | 6/2012 | Sweeney | G06F 16/367 707/749 |
| 2014/0114962 A1* | 4/2014 | Rosenburg | G06Q 10/063 707/723 |
| 2014/0181100 A1* | 6/2014 | Ramer | G06F 3/0236 707/728 |
| 2015/0278902 A1* | 10/2015 | Warren | G06Q 30/0623 705/26.61 |
| 2016/0373891 A1* | 12/2016 | Ramer | H04W 4/02 |
| 2017/0371925 A1* | 12/2017 | Arya | G06F 16/9024 |
| 2017/0372204 A1* | 12/2017 | Sweeney | G06Q 30/0269 |
| 2018/0204111 A1* | 7/2018 | Zadeh | G06N 3/0436 |
| 2018/0322208 A1* | 11/2018 | Barrios Núñez et al. | G06N 3/08 |
| 2020/0004875 A1* | 1/2020 | McAteer | G06F 16/3334 |

\* cited by examiner

DYNAMICALLY AUGMENTING QUERY TO SEARCH FOR CONTENT NOT PREVIOUSLY KNOWN TO THE USER

TECHNICAL FIELD

The present invention relates generally to search queries, and more particularly to dynamically augmenting a query to search for content of interest to the user not previously known to the user.

BACKGROUND

Search queries, such as database queries and web search queries, involve the task of searching content. For example, a database is an organized collection of data, generally stored and accessed electronically from a computer system, such as via a search query. In another example, a web search query is a query based on a specific search term that a user enters into a web search engine to satisfy his or her information needs.

SUMMARY

In one embodiment of the present invention, a computer-implemented method for improving query searches comprises monitoring and identifying queries issued as well as content searched and published on a network by users of computing devices. The method further comprises analyzing the content to generate content tags, where the content tags are keywords or terms used to describe the analyzed content. The method additionally comprises analyzing the queries to generate query tags, where the query tags are keywords or terms used to describe the analyzed queries. Furthermore, the method comprises storing the query tags and content tags in a central repository. Additionally, the method comprises receiving a query to conduct a content search. In addition, the method comprises analyzing the query for semantic meaning. In addition, the method comprises identifying a group of query tags and content tags in the central repository that is most semantically similar in meaning to the semantic meaning of the query. The method further comprises analyzing content tags and query tags in a user repository to determine interests of a user, where the user repository stores query tags and content tags based on analyzing queries issued and content of inventories searched and published on the network by the user. The method additionally comprises augmenting the query to include one or more other terms of interest that match the determined interests of the user within a threshold degree of relatedness, where the one or more other terms of interest comprise query tags and/or content tags from the identified group of query tags and content tags based on their assigned weight.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a computer-implemented method, system and computer program product for improving query searches. In one embodiment of the present invention, queries issued on a network as well as content searched and published on the network by users are monitored and identified. The content is analyzed to generate content tags, which are keywords or terms used to describe the analyzed content. Furthermore, the queries are analyzed to generate query tags, which are keywords or terms used to describe the analyzed queries. Such content and query tags are stored in a central repository and are categorized into groups based on semantic relatedness thereby connecting inventories with queries. Furthermore, the query tags that describe the analyzed queries issued by a particular user and the content tags that describe the analyzed content searched and published by that particular user are stored in a user repository for that particular user. After receiving a query from a user to conduct a content search, the query is analyzed for its semantic meaning and a categorized group of query tags and content tags in the central repository that is most semantically similar in meaning to the meaning of the query is identified. Furthermore, the content tags and query tags in the user's repository are analyzed to determine the interests of the user. The query may then be augmented to include one or more other terms of interest from the identified group of query tags and content tags in the central repository that match the determined interests of the user within a threshold degree of relatedness, where the other terms of interest correspond to the content tags and query tags of the identified group based on their assigned weight. By linking the central and user repositories and determining the user's interests, the system is able to augment queries to include terms of interest (tags) that the user may not have previously contemplated or known. As a result, the user is able to search for content that was not previously contemplated or known to the user but that may be of great interest to the user. In this manner, the present invention enables the user to search for content of interest to the user not previously contemplated or known to the user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
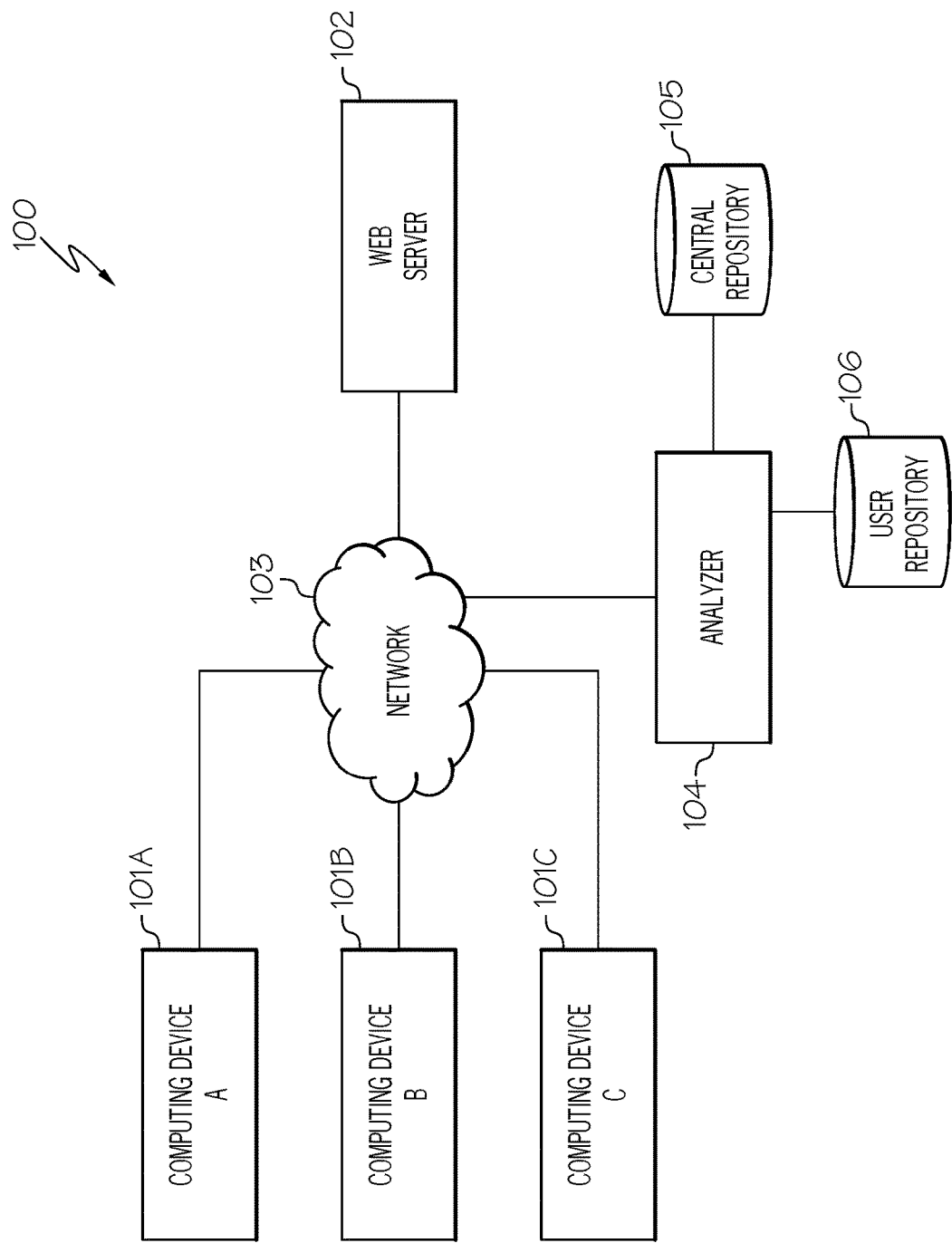
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a web server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and web server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Web server 102 is configured to host websites and serve contents to the World Wide Web. Furthermore, web server 102 is configured to process incoming network requests over HTTP (Hypertext Transfer Protocol) and several other related protocols.

System 100 further includes what is referred to herein as an "analyzer" 104 connected to network 103 by wire or wirelessly. Analyzer 104 is configured to monitor and identify user activities on a network (e.g., Internet), such as queries issued and content searched or published by the users of computing devices 101. For example, queries may include video queries, text queries and natural language queries. Content may include images, videos, photographs and web content (e.g., web searches). In one embodiment, such monitoring may involve capturing network traffic via port mirroring or a network tap. In another embodiment, such monitoring may involve monitoring posts on publicly available profiles on social media websites. In another embodiment, such monitoring may involve acquiring a log of the user's search queries, such as from a search engine with the user's permission. In one embodiment, queries are identified based on identifying terms being entered into a search engine by the user or based on receiving a log of the user's search queries, such as from the search engine. In another example, the content searched or published by a user may be identified based on identifying the user searching or publishing content, such as images, photographs, videos, etc. on a network. In a further example, web content searched or published may also be made available to analyzer 104 from the search engine.

Analyzer 104 is further configured to analyze the identified queries and content searched or published as discussed further below in connection with FIG. 2, which illustrates the components of analyzer 104 used to analyze the queries issued and content searched or published. In one embodiment, the queries are analyzed to generate "query tags," which are keywords or terms used to described the queries monitored/analyzed. Furthermore, in one embodiment, the content is analyzed to generated "content tags," which are keywords or terms used to describe the content monitored/analyzed. Such information (query tags and content tags) may be stored in a central repository 105 connected to analyzer 104. Central repository 105, as used herein, refers to the location where tags (query tags and content tags) are stored and maintained, where such tags are obtained from monitoring/analyzing queries issued and content searched and published by multiple users of computing devices 101.

Furthermore, analyzer 104 may also be configured to store and maintain tags (query tags and content tags) in a user repository 106 connected to analyzer 104, which is used to store tags for a specific user (e.g., user of computing device 101A). The tags stored in user repository 106 may be used to determine the interests of the corresponding user as discussed further below. A hardware configuration of analyzer 104 is provided below in connection with FIG. 3.

System 100 is not to be limited in scope to any one particular network architecture. System 100 may include any number of computing devices 101, web servers 102, networks 103, analyzers 104 and repositories 105, 106. Furthermore, while FIG. 1 illustrates analyzer 104 as being a separate physical device, some or all of the functionality of analyzer 104 may reside in computing device 101.

Figure 2:
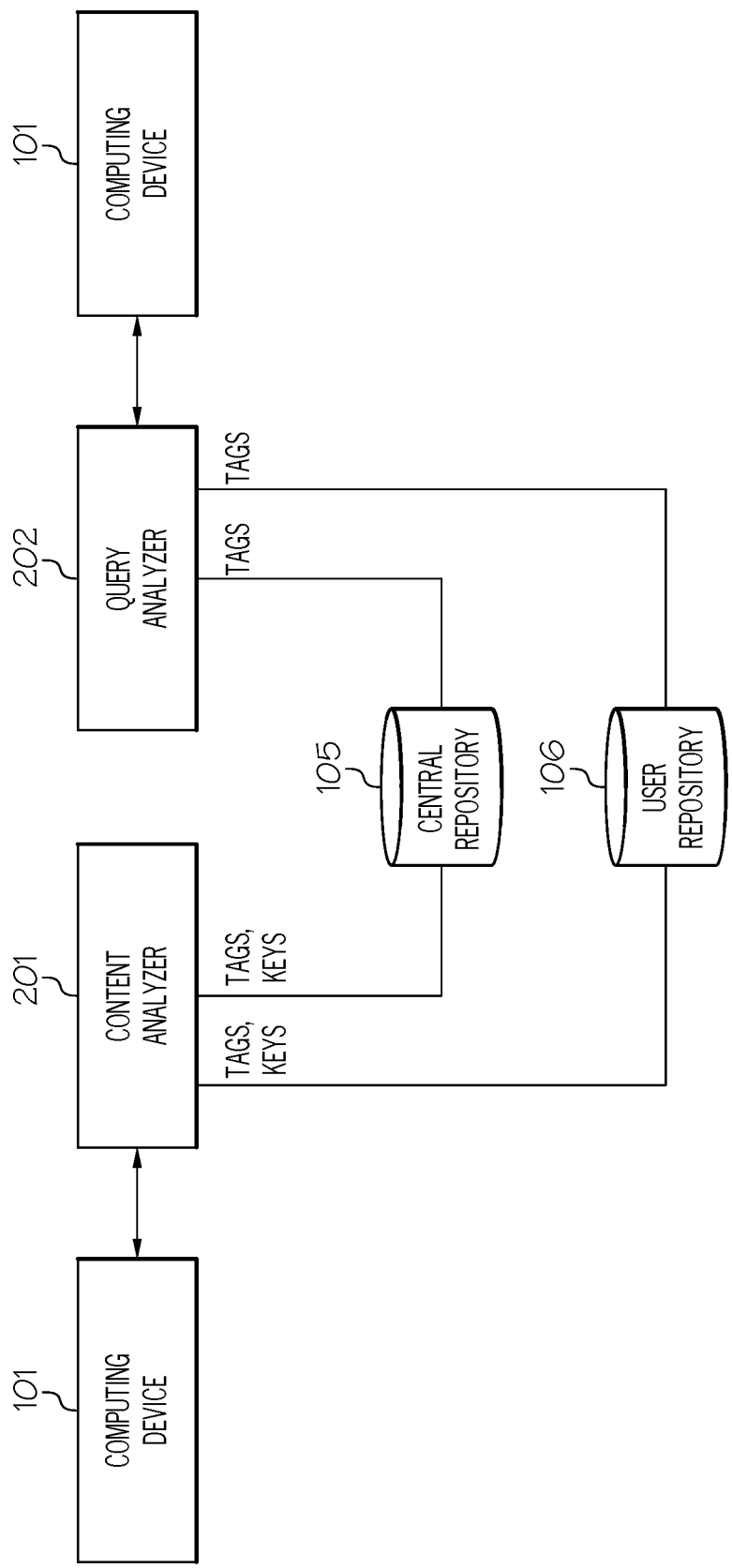
FIG. 2 illustrates the components of the analyzer used to analyze the monitored queries and content in accordance with an embodiment of the present invention.

Referring now to FIG. 2, FIG. 2 illustrates the components of analyzer 104 used to analyze the monitored/identified queries and content in accordance with an embodiment of the present invention.

As shown in FIG. 2, in conjunction with FIG. 1, analyzer 104 includes a content analyzer 201 and a query analyzer 202. In one embodiment, such components are implemented in software (e.g., reside within application 304 of analyzer 104). In another embodiment, such components are implemented in hardware or a combination of hardware and software.

Content analyzer 201 is configured to analyze content searched or published by users of computing devices 101 on a network (e.g., Internet) to generate content tags, which are stored in central repository 105, user repository 106 as discussed above. In one embodiment, content analyzer 201 utilizes natural language processing to identify the keywords or terms used to describe the content analyzed. For example, if a user of computing device 101 published an inventory of Elvis Presley memorabilia, then such memorabilia may be tagged with the keywords of Elvis Presley as well as the type of memorabilia (e.g., LP record). For instance, the user may publish a post that discusses Elvis Presley memorabilia and then post the user's collection of Elvis Presley memorabilia. Content analyzer 201, using natural language processing, would identify such memorabilia as being connected to the singer Elvis Presley since these posts were made within a short period of time within one another and content analyzer 201 has identified other people who have collected Elvis Presley memorabilia.

Similarly, query analyzer 202 is configured to analyze queries issued by users of computing devices 101 on a network (e.g., Internet) to generate query tags, which are stored in central repository 105, user repository 106 as discussed above. In one embodiment, query analyzer 202 utilizes natural language processing to identify the keywords or terms used to describe the query analyzed. For example, if the user of computing device 101 issued the query "Elvis records hard to find rare coveted," then terms, such as "Elvis," "rare," "coveted" and "hard to find" may be identified via natural language processing which are directed to famous people and adjectives used to describe such records that are desired to be located.

As also illustrated in FIG. 2, the tags discussed above, are stored in central repository 105. Furthermore, the tags generated based on analyzing content searched or published by a particular user (e.g., user of computing device 101A) or the tags generated based on analyzing the queries issued by a particular user (e.g., user of computing device 101A) are stored in user repository 106, which is a repository that only stores tags for that user (e.g., user of computing device 101A). As will be discussed further herein, such tags will be used to determine the interests of the user.

Furthermore, content analyzer 201 is configured to generate "keys," which correspond to the storage location of the analyzed content. Such keys are associated with the content tags used to describe the keywords or terms of the analyzed content and are stored in the appropriate repository 105, 106 along with the storage of the associated content tags. As discussed further below, in one embodiment, these keys may be used to obtain the content requested in a query. For example, the user's initial query to conduct a content search may be augmented with tags, such as content tags, that are associated with keys directing analyzer 104 where to obtain the requested content.

Additionally, in one embodiment, the content tags and query tags are categorized in central repository 105 based on semantic relatedness thereby connecting inventories with queries. As used herein, "semantic relatedness," is a metric defined over a set of documents or terms, where the idea of distance between them is based on the usage of such terms to identify or describe similar content. Semantic relatedness includes any relation between two terms. For example, the tags of plates and Elvis Presley may be determined to have semantic relatedness since such terms have been identified together in various posts online directed to Elvis Presley memorabilia. In one embodiment, semantic relatedness between terms can be estimated using statistical means, such as a vector space model to correlate words and textual contexts from a suitable text corpus. In one embodiment, the semantic relatedness of the content tags and query tags are determined using natural language processing and are then categorized based on having similar relatedness within a threshold of relatedness. For example, the tags of "Trammell" and "bat" may be determined to have similar relatedness exceeding a threshold of relatedness based on the frequency of times such terms have been used together.

Furthermore, as discussed further below, a weighted value may be applied to such stored tags in the categorized groups based on the frequency of usage of the tag used in connection with the categorized group. For example, the higher frequency that "Elvis Presley" is used in connection with the term "plate," the higher the weight value is applied to the term "Elvis Presley." Such weighted values are utilized to determine which tags, if any, should be added to a query issued by the user of computing device 101 to enable the user to search for content not previously contemplated or known to the user.

Additionally, FIG. 2 illustrates the "feedback" mechanism between content analyzer 201/query analyzer 202 and the users of computing devices 101. Such feedback involves the users of computing devices 101 providing feedback to content analyzer 201/query analyzer 202 as to the acceptance (or lack of acceptance) to tagging content searched or published with terms of interest/tags or augmenting queries with terms of interest/tags. For example, the user of computing device 101 may published an inventory of plates on a network. After analyzing such content and determining that such content relates to plates using natural language processing, content analyzer 201 analyzes the tags stored in user repository 106 to determine that the user has an interest in Elvis Presley memorabilia. Content analyzer 201 may then propose tagging such published plates with the tag of "Elvis Presley," since "Elvis Presley plates" has been found to be semantically related. That is, the tag of "Elvis Presley" may be proposed to be tagged to the term "plate" due to the weighted value assigned to "Elvis Presley" in connection with the term "plate" exceeding a threshold value. After recommending such proposed tagging to the user, the user may respond accordingly (e.g., accept or reject proposed tagging), which content analyzer 201 uses such feedback to adjust the weighted value of "Elvis Presley." For example, the weighted value of "Elvis Presley" would be decreased if the user rejected the proposed tagging; whereas, the weighted value of "Elvis Presley" would be increased if the user accepted the proposed tagging.

In another example, the user of computing device 101 may issue a query to conduct a content search that includes the terms "rare records." Based on analyzing the tags stored in user repository 106 to determine that the user has an interest in Elvis Presley memorabilia, and based on the categorized grouping of query tags and content tags that includes the tags of "Elvis Presley" "rare records" and "hard to find," query analyzer 202 may recommend to the user of computing device 101 to augment the query to state "Elvis Presley records hard to find." Based on the user's feedback, the weighted value of "Elvis Presley" and "hard to find" would be adjusted accordingly based on the user's acceptance or lack of acceptance to the proposed augmentation. For example, the weighted value of "Elvis Presley" and "hard to find" would be decreased if the user rejected the recommendation; whereas, the weighted value of "Elvis Presley" and "hard to find" would be increased if the user accepted the recommendation.

In a further example, the user of computing device 101 may issue a query to conduct a content search that includes the term "plates." If there are categorized content tags and query tags in central repository 105 that relate Lucille Ball (famous person) with the tags of "plates" and "collectable," then analyzer 104 may deduce via natural language processing of the linkage between "collectable" and "plates" based on the frequent usage of "collectable plates" with Lucille Ball (famous person) to form the category of "collectable plates" for famous people. Based on analyzing the tags stored in user repository 106 to determine that the user has an interest in Elvis Presley memorabilia, and based on "Elvis Presley" being associated with the category of "collectable," and based on "Elvis Presley" being deemed to be a famous person based on the frequent usage of "famous" with "Elvis Presley," then query analyzer 202 may recommend to the user of computing device 101 to augment the query to state "Elvis Presley collectable plate."

Furthermore, while FIG. 2 illustrates content analyzer 201 and query analyzer 202 as being separate components, the principles of the present invention are not to be limited in scope to such an embodiment. That is, the functionality of content analyzer 201 and query analyzer 202 discussed above may be provided by a single unit.

Figure 3:
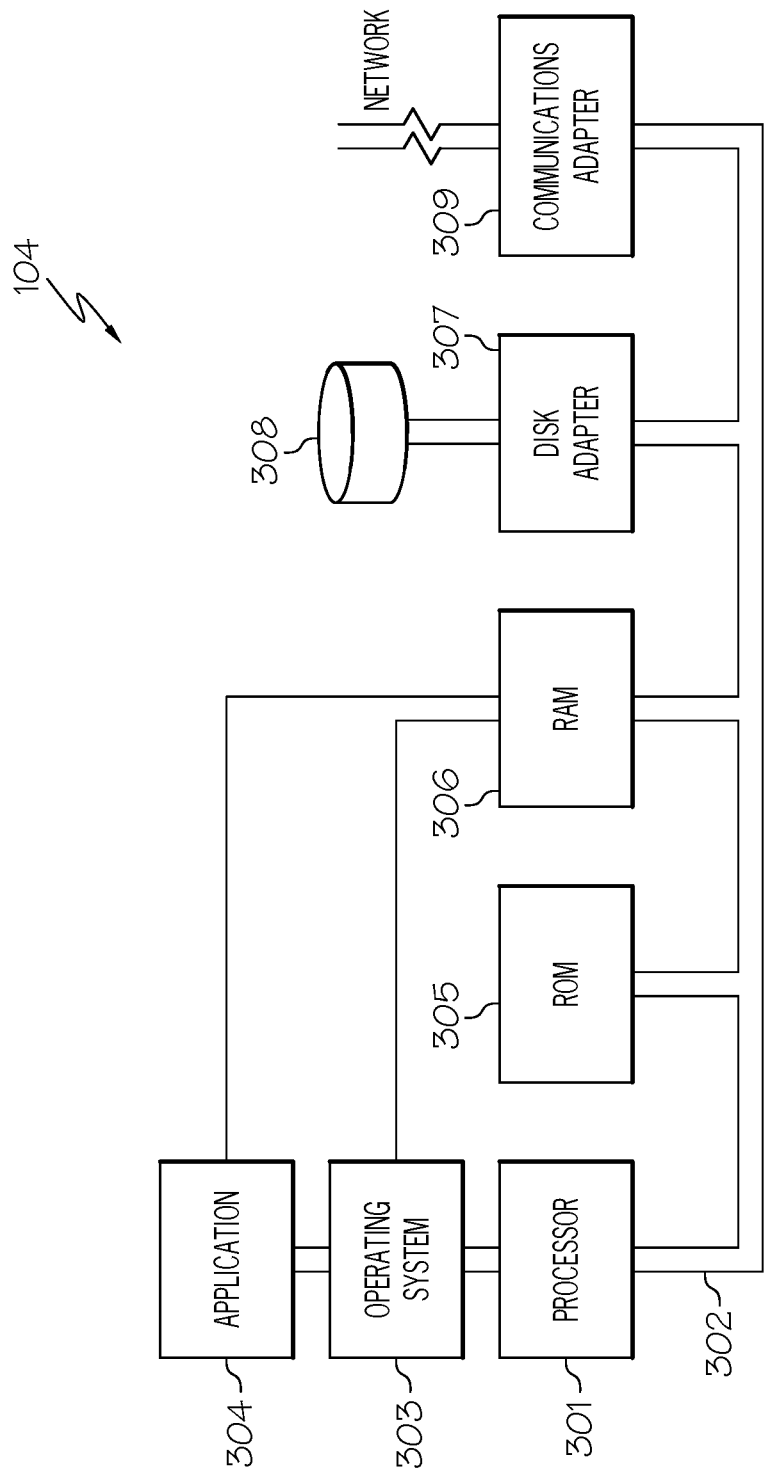
FIG. 3 illustrates a hardware configuration of the analyzer which is representative of a hardware environment for practicing the present invention.

Referring now to FIG. 3, FIG. 3 illustrates a hardware configuration of analyzer 104 (FIG. 1) which is representative of a hardware environment for practicing the present invention. Referring to FIG. 3, analyzer 104 has a processor 301 connected to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for dynamically augmenting a query to search for content of interest to the user not previously contemplated or known by the user, as discussed below in associated with FIGS. 4-7.

Referring again to FIG. 3, read-only memory ("ROM") 305 is connected to system bus 302 and includes a basic input/output system ("BIOS") that controls certain basic functions of analyzer 104. Random access memory ("RAM") 306 and disk adapter 307 are also connected to system bus 302. It should be noted that software components including operating system 303 and application 304 may be loaded into RAM 306, which may be analyzer's 104 main memory for execution. Disk adapter 307 may be an integrated drive electronics ("IDE") adapter that communicates with a disk unit 308, e.g., disk drive. It is noted that the program for dynamically augmenting a query to search for content of interest to the user not previously contemplated or known by the user, as discussed below in associated with FIGS. 4-7, may reside in disk unit 308 or in application 304.

Analyzer 104 may further include a communications adapter 309 connected to bus 302. Communications adapter 309 interconnects bus 302 with an outside network (e.g., network 103 of FIG. 1) thereby allowing analyzer 104 to communicate with computing devices 101 and web server 102.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, search queries, such as database queries and web search queries, involve the task of searching content. For example, a database is an organized collection of data, generally stored and accessed electronically from a computer system, such as via a search query. In another example, a web search query is a query based on a specific search term that a user enters into a web search engine to satisfy his or her information needs. However, in conducting a content search, there are times that the user may not know of existing content that may be of interest to the user. As a result, the user would not be able to conduct a search for such content since the user has no knowledge of such content. For example, the user may collect Star Wars® comic books and may not be aware of the 0.350 variant edition of the first issue of the 1977 Star Wars® comic book. As the user is a collector of Star Wars® comic books, the user may be very interested in searching for content concerning such a variant edition of the Star Wars® comic books. However, the user would not be able to conduct such a search since the user has no knowledge of such a variant comic edition. As a result, there is not currently a means for effectively searching for content of interest to the user not previously known to the user.

Figure 4:
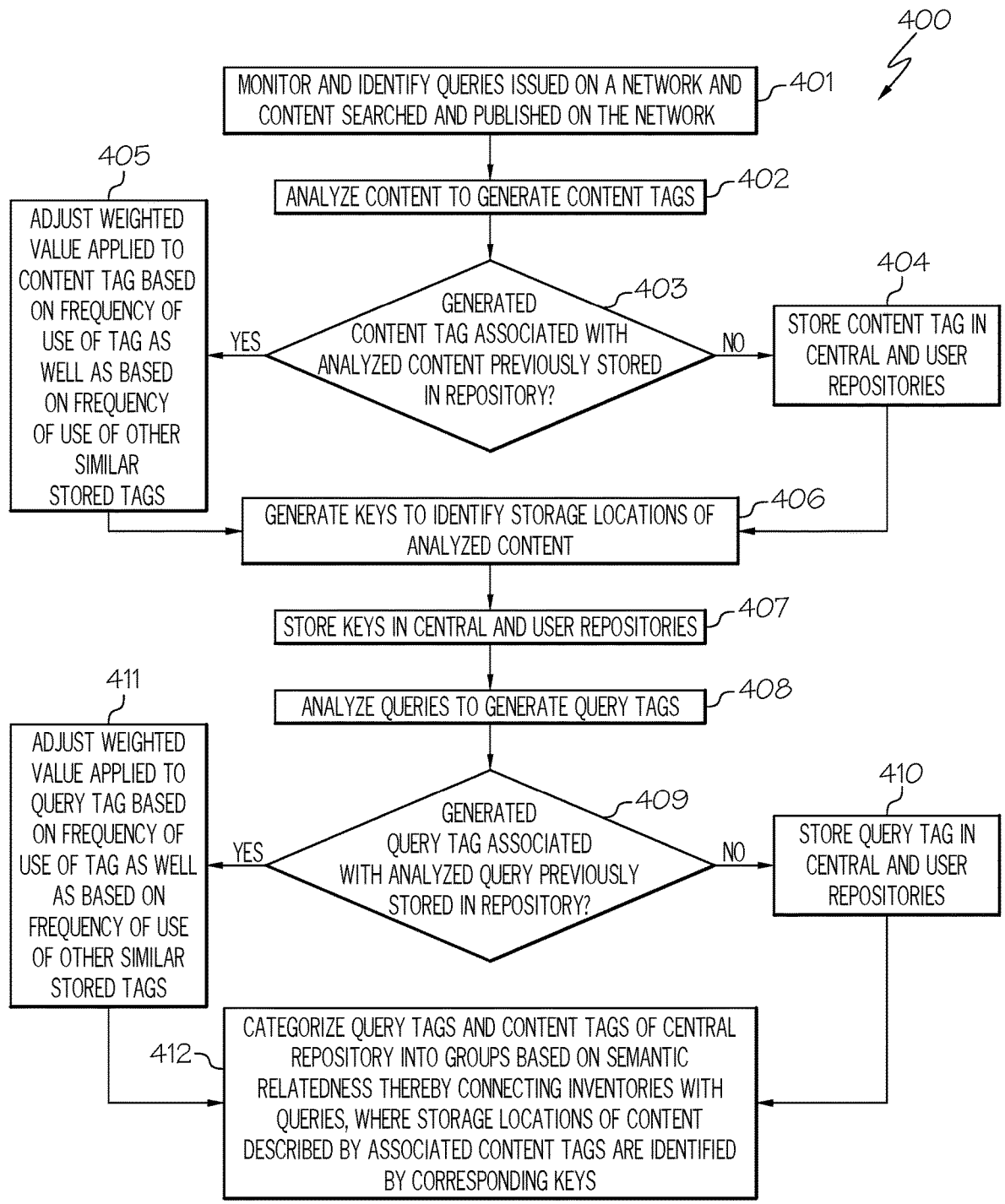
FIG. 4 is a flowchart of a method for building the central and user repositories in accordance with an embodiment of the present invention.
Figure 5:
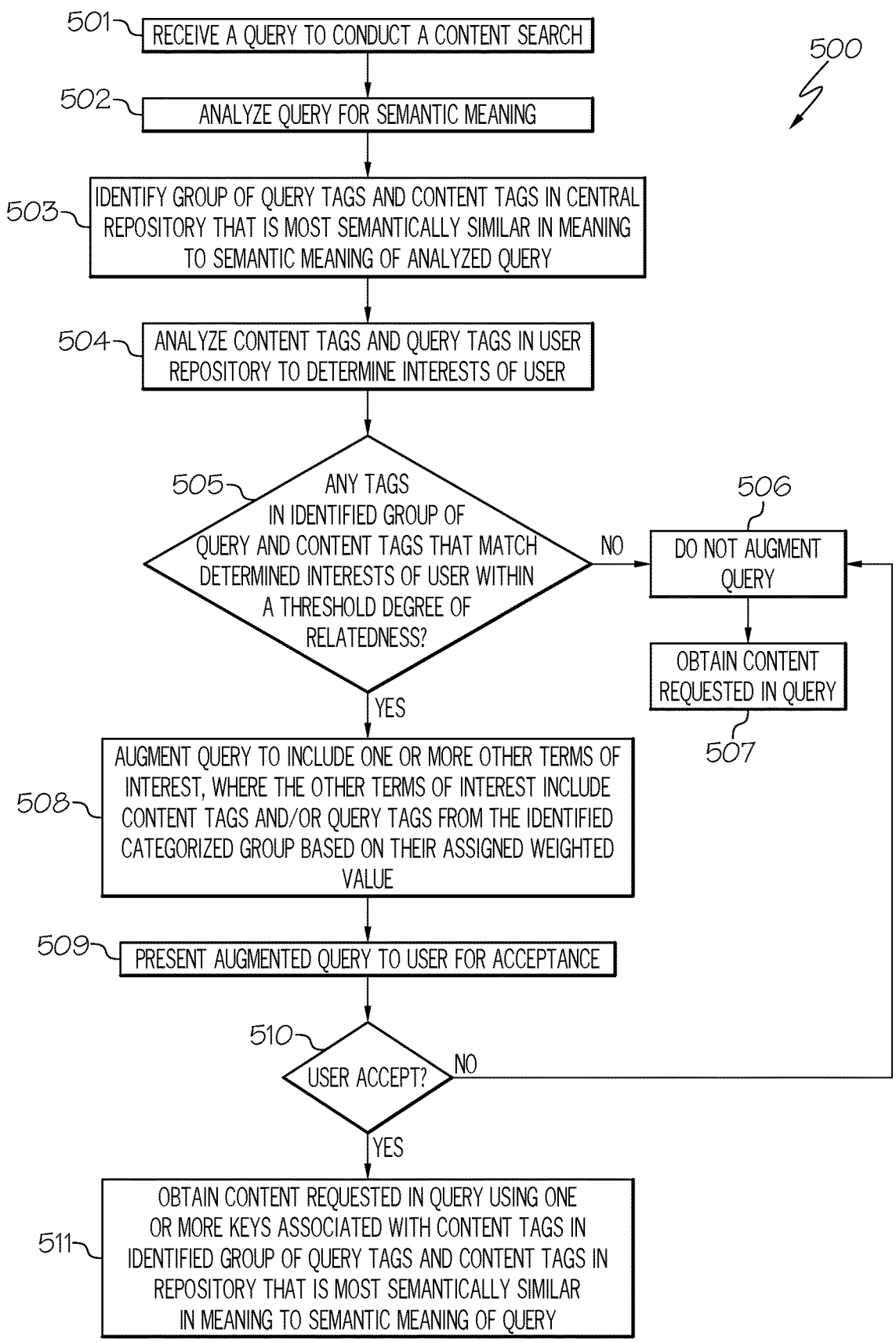
FIG. 5 is a flowchart of a method for augmenting the query to search for content of interest to the user not previously known to the user in accordance with an embodiment of the present invention.
Figure 6:
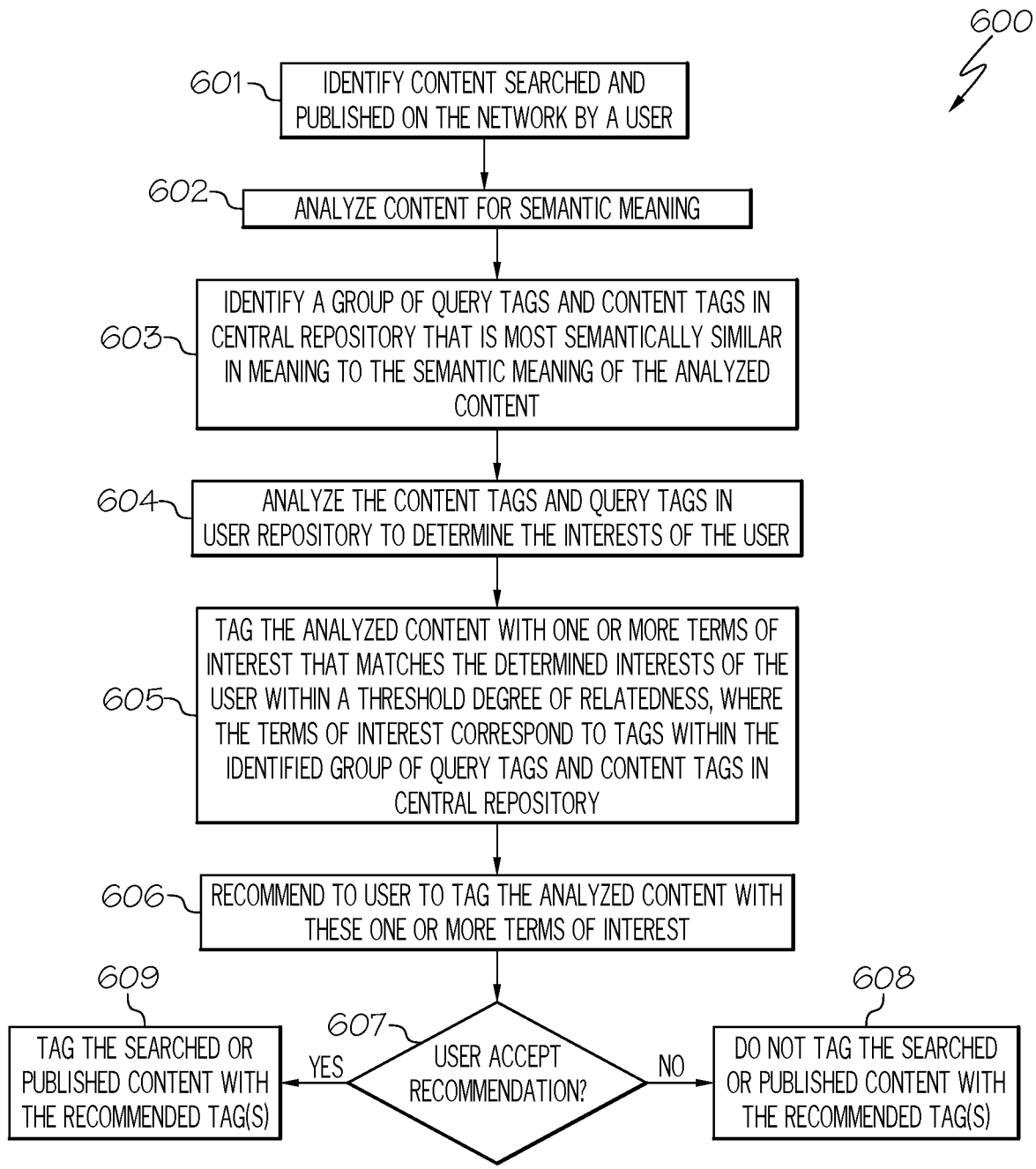
FIG. 6 is a flowchart of a method for tagging content searched or published by the user in accordance with an embodiment of the present invention.
Figure 7:
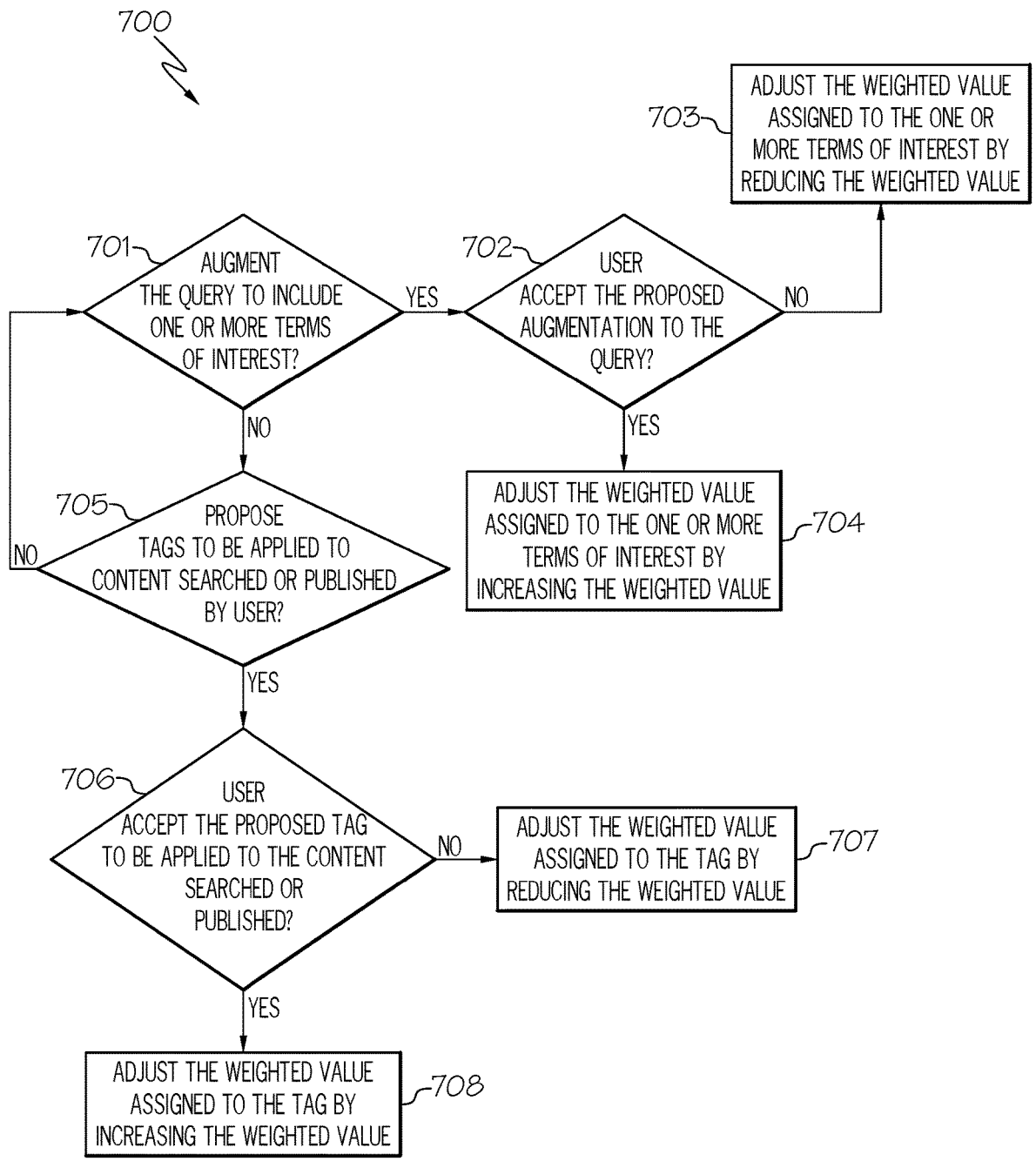
FIG. 7 is a flowchart of a method for adjusting the weighted values applied to the tags based on feedback received from the users in accordance with an embodiment of the present invention.

The embodiments of the present invention provide a means for enabling users to conduct a search for locating content of interest to the user not previously contemplated or known to the user as discussed below in connection with FIGS. 4-7. FIG. 4 is a flowchart of a method for building the central and user repositories. FIG. 5 is a flowchart of a method for augmenting the query to search for content of interest to the user not previously known to the user. FIG. 6 is a flowchart of a method for tagging content searched or published by the user. FIG. 7 is a flowchart of a method for adjusting the weighted values applied to the tags based on feedback received from the users.

As stated above, FIG. 4 is a flowchart of a method 400 for building the central and user repositories 105, 106 (FIGS. 1 and 2) in accordance with an embodiment of the present invention.

Referring to FIG. 4, in conjunction with FIGS. 1-3, in step 401, analyzer 104 monitors and identifies the queries issued on a network as well as monitors and identifies the content (content of inventories) searched and published on the network by the users of computing devices 101 as discussed above.

In step 402, content analyzer 201 analyzes the identified content to generate content tags, where the content tags are keywords or terms used to describe the analyzed content as discussed above.

In step 403, a determination is made by analyzer 104 for each of the generated content tags as to whether the generated content tag associated with the analyzed content was previously stored in a repository, such as repositories 105, 106. For example, if the analyzed content dealt with records, which was learned using natural language processing, and the content tags of "hard to find" and "Elvis Presley" were generated, then a determination is made by analyzer 104 as to whether the tags of "Elvis Presley" and "hard to find" were previously stored in a repository involving the content of records.

If the generated content tag was not previously stored in a repository in connection with the analyzed content, then, in step 404, analyzer 104 stores that content tag in the central and user repositories 105, 106. For example, if the tag of "hard to find" was not previously stored in a repository involving the content of records, then that tag would now be stored in central and user repositories 105, 106 in connection with the content of records.

If, however, the generated content tag was previously stored in a repository in connection with the analyzed content, then, in step 405, analyzer 104 adjusts the weighted value applied to the content tag based on the frequency of use of the tag as well as based on the frequency of use of other similar stored content tags, including those with misspellings. In one embodiment, similar stored content tags are determined by analyzer 104 utilizing natural language processing. For example, the tag of "Evlis Presley" may be identified as being a misspelling of "Elvis Presley" using natural language processing since it used in connection with similar content, such as records. As a result, if the tag of "Elvis Presley" or a variation thereof, including misspellings (e.g., "Evlis Presley"), was previously stored in a repository involving the content of records, then the weighted value applied to that tag would be adjusted (e.g., increased) based on the frequency of usage of the tag, including variations, in connection with the analyzed content.

After storing the content tag or adjusting the weighted value applied to the content tag, in step 406, analyzer 104 generates keys to identify the storage locations of the analyzed content.

In step 407, analyzer 104 stores the generated keys in central and user repositories 105, 106.

In step 408, query analyzer 202 analyzes the identified queries to generate query tags, where the query tags are keywords or terms used to describe the analyzed queries as discussed above.

In step 409, a determination is made by analyzer 104 for each of the generated query tags as to whether the generated query tag associated with the analyzed query was previously stored in a repository, such as repositories 105, 106. For example, if the analyzed query dealt with searching for the content of Elvis records, which was learned using natural language processing, and the query tags of "hard to find" and "Elvis Presley" were generated, then a determination is made by analyzer 104 as to whether the tags of "Elvis Presley" and "hard to find" were previously stored in a repository involving the query of searching for the content of Elvis records.

If the generated query tag was not previously stored in a repository in connection with the analyzed query, then, in step 410, analyzer 104 stores that query tag in the central and user repositories 105, 106. For example, if the tag of "hard to find" was not previously stored in a repository involving the search query for Elvis records, then that tag would now be stored in central and user repositories 105, 106 in connection with the query for Elvis records.

If, however, the generated query tag was previously stored in a repository in connection with the analyzed query, then, in step 411, analyzer 104 adjusts the weighted value applied to the query tag based on the frequency of use of the tag as well as based on the frequency of use of other similar stored query tags, including those with misspellings. As discussed above, in one embodiment, similar stored query tags are determined by analyzer 104 utilizing natural language processing. For example, the tag of "Evlis Presley" may be identified as being a misspelling of "Elvis Presley" using natural language processing since it used in connection with querying for similar content, such as records. As a result, if the tag of "Elvis Presley" or a variation thereof, was previously stored in a repository involving the search for Elvis records, then the weighted value applied to that tag would be adjusted (e.g., increased) based on the frequency of usage of the tag, including variations, in connection with the analyzed query.

After storing the query tag or adjusting the weighted value applied to the query tag, in step 412, analyzer 104 categorizes the query tags and content tags of central repository 105 into groups based on semantic relatedness thereby connecting inventories with queries, where the storage locations of the content described by the associated content tags are identified by corresponding keys. As used herein, "semantic relatedness," is a metric defined over a set of documents or terms, where the idea of distance between them is based on the usage of such terms to identify or describe similar content. Semantic relatedness includes any relation between two terms. For example, the tags of plates and Elvis Presley may be determined to have semantic relatedness since such terms have been identified together in various posts online directed to Elvis Presley memorabilia. In one embodiment, semantic relatedness between terms can be estimated using statistical means, such as a vector space model to correlate words and textual contexts from a suitable text corpus. In one embodiment, the semantic relatedness of the content tags and query tags are determined using natural language processing and are then categorized based on having similar relatedness within a threshold of relatedness. For example, the tags of "Trammell" and "bat" may be determined to have similar relatedness exceeding a threshold of relatedness based on the frequency of times such terms have been used together.

FIG. 5 is a flowchart of a method 500 for augmenting the query to search for content of interest to the user not previously known to the user in accordance with an embodiment of the present invention.

Referring to FIG. 5, in conjunction with FIGS. 1-4, in step 501, analyzer 104 receives a query to conduct a content search from a user of computing device 101.

In step 502, analyzer 104 analyzes the query for semantic meaning. The semantic meaning of the analyzed query may be determined by analyzer 104 utilizing natural language processing. "Semantic meaning," as used herein, refers to knowing what the collection of words (e.g., words, phrases) in the query actually means. For instance, it can be inferred that the meaning of the query involving the terms "ball" and "bat" refers to a baseball bat as opposed to being directed to a bat that is a mammal due to the fact that the word "ball" is used in close proximity to the term "bat."

In step 503, analyzer 104 identifies the group of query tags and content tags in central repository 105 that is most semantically similar in meaning to the semantic meaning of the analyzed query. For example, as discussed above, the query may be determined to be a query directed to a baseball bat. Hence, analyzer 104 will identify a group of query tags and content tags in central repository 105 that is most semantically similar in meaning to a baseball bat, such as the categorized group directed to baseball equipment. As previously discussed, the query tags and content tags of central repository 105 are categorized into groups based on semantic relatedness thereby connecting inventories with queries.

In step 504, analyzer 104 analyzes the content tags and query tags in user repository 106 to determine the interests of the user as discussed above. For example, analyzer 104 may utilize natural language processing to determine the interests of the user based on the tags stored in user repository 106. For instance, relevant terms may be extracted from the tags, such as "Elvis Presley" and "records," which may be associated with a high weighted value due to its high frequency of usage by the user. Such extracted terms may be used to deduce that the user has an interest in collecting Elvis Presley records.

In step 505, a determination is made by analyzer 104 as to whether there are any tags in the identified group of query tags and content tags that match the determined interests of the user within a threshold degree of relatedness. "Threshold degree of relatedness," as used herein, refers to the degree that the meaning of the query tags and content tags needs to be related to the determined interests of the user. Such a degree may be expressed in terms of a value, where the more related the tags are to the determined interests of the user, then the higher the value.

For example, analyzer 104 may utilize natural language processing to determine if the user's interest in collecting Elvis Presley records match any of the tags within the identified group of query tags and content tags in central repository 105 (group of tags that is most semantically similar in meaning to the semantic meaning of the analyzed query) within a threshold degree of relatedness. For example, the identified group of query tags and content tags may include the tags of "out of print" and "vinyl" which may be deemed to have a semantic relatedness with "Elvis Presley records" that exceeds a threshold degree of relatedness. For instance, analyzer 104 may deduce via natural language processing that vinyl records are out of print and that Elvis Presley records are commonly vinyl records that are out of print. Hence, it may be deduced that such tags are related to the determined interests of the user that exceeds a threshold degree of relatedness.

In one embodiment, such a threshold degree of relatedness is user-specified. In one embodiment, such a threshold degree of relatedness may be expressed in terms of a value indicating how related a tag is to an interest of a user. For example, the higher the degree of relatedness, then the higher the value.

If there are no tags in the identified group of query tags and content tags that match the determined interests of the user within a threshold degree of relatedness, then, in step 506, analyzer 104 does not augment the query.

In step 507, analyzer 104 obtains the content requested in the query.

If, however, there are tags in the identified group of query tags and content tags that match the determined interests of the user within a threshold degree of relatedness, then, in step 508, query analyzer 202 augments the query to include one or more other terms of interest that correspond to the tags within the identified group of query tags and content tags that match the determined interests of the user within a threshold degree of relatedness. In one embodiment, such added terms of interest correspond to tags that are selected based on their assigned weight. For example, such added terms of interest correspond to tags with a weighted value that exceeds a threshold value. In this manner, the user will be able to search for content that was not previously contemplated or known to the user but that may be of great interest to the user.

For example, the user may have previously entered the search query of "Star Wars® comic books." Analyzer 104 may then augment the query to include the tags of "variant edition" to enable the user to search for a variant edition of the Star Wars® comic books based on identifying the tags of "variant edition" in the categorized group of Star Wars® comic books. The user may not have contemplated or known about a variant edition of Star Wars® comic books which may be of interest to the user which analyzer 104 deduces based on determining that the user has an interest in collecting Star Wars® comic books from analyzing the tags in the user's repository 106.

In step 509, query analyzer 202 presents the augmented query to the user for acceptance. In one embodiment, the lack of acceptance may be determined based on the user not accepting the proposed augmentation of the query within a certain period of time. In another embodiment, acceptance or lack of acceptance may be determined based on the user selecting an option displayed on the user's computing device to accept or not accept the recommended augmented query, such as via a drop-down menu, a drop-down list, a combo box, etc.

In step 510 query analyzer 202 determines whether the user accepted the recommended augmented query.

If the user does not accept the augmented query, then analyzer 104 reverses the augmentation so that the query is not augmented in step 506. Furthermore, as discussed further below, the weighting associated with such an augmentation (e.g., the added tags of "variant edition") will be lessened so as to preclude making such a suggestion in the future.

If, however, the user accepts the augmented query, then, in step 511, analyzer 104 obtains the content requested in the query using one or more keys associated with the content tags in the identified group of query tags and content tags in central repository 105 that is most semantically similar in meaning to the semantic meaning of the query.

Referring now to FIG. 6, FIG. 6 is a flowchart of a method 600 for tagging content searched or published by the user in accordance with an embodiment of the present invention.

Referring to FIG. 6, in conjunction with FIGS. 1-5, in step 601, analyzer 104 identifies content searched and published on the network by a user of computing device 101 as discussed above.

In step 602, analyzer 104 analyzes the content for semantic meaning. The semantic meaning of the analyzed content may be determined by analyzer 104 utilizing natural language processing. For example, it can be inferred that the content searched or published involving "plates" refers to "collectable plates" based on the terms "collector" and "plates" being used in connection with posting images of such plates.

In step 603, analyzer 104 identifies a group of query tags and content tags in central repository 105 that is most semantically similar in meaning to the semantic meaning of the analyzed content in a similar manner as discussed above in connection with step 503.

In step 604, analyzer 104 analyzes the content tags and query tags in user repository 106 to determine the interests of the user as discussed above in connection with step 504.

In step 605, analyzer 104 tags the analyzed content with one or more terms of interest that matches the determined interests of the user within a threshold degree of relatedness, where the terms of interest correspond to tags within the identified group of query tags and content tags in central repository 105. The analysis involved in matching the terms of interest with the interests of the user is performed in a similar manner as discussed above in connection with step 505. In one embodiment, tags that are selected based on their assigned weight. For example, only tags are selected with a weighted value that exceeds a threshold value.

In step 606, analyzer 104 recommends to the user to tag the analyzed content with these one or more terms of interest.

In step 607, a determination is made by analyzer 104 as to whether the user accepted the recommendation.

If the user did not accept the recommendation, then, in step 608, analyzer 104 does not tag the searched or published content with the recommended tag(s).

If, however, the user did accept the recommendation, then, in step 609, analyzer 104 tags the searched or published content with the recommended tag(s).

As the central and user repositories 105, 106 are being built and utilized, analyzer 104 continues to adjust the weighted values applied to the tags based on feedback from the users of computing devices 101 as discussed below in connection with FIG. 7.

FIG. 7 is a flowchart of a method 700 for adjusting the weighted values applied to the tags based on feedback received from the users of computing devices 101 in accordance with an embodiment of the present invention.

Referring to FIG. 7, in conjunction with FIGS. 1-6, in step 701, a determination is made by analyzer 104 if analyzer 104 augments the query to include one or more terms of interest as discussed above in connection with step 508.

If analyzer 104 augments the query to include one or more terms of interest as discussed above, then, in step 702, a determination is made by analyzer 104 as to whether the user accepted the proposed augmentation to the query.

If the user does not accept the augmentation to the query, then, in step 703, analyzer 104 adjusts the weighted value assigned to the one or more terms of interest by reducing the weighted value.

If, however, the user accepted the augmentation to the query, then, in step 704, analyzer 104 adjusts the weighted value assigned to the one or more terms of interest by increasing the weighted value.

For example, the user of computing device 101 may issue a query to conduct a content search that includes the terms "rare records." Based on analyzing the tags stored in user repository 106 to determine that the user has an interest in Elvis Presley memorabilia, and based on the categorized grouping of query tags and content tags that includes the tags of "Elvis Presley" "rare records" and "hard to find," query analyzer 202 may recommend to the user of computing device 101 to augment the query to state "Elvis Presley records hard to find." Based on the user's feedback, the weighted value of "Elvis Presley" and "hard to find" would be adjusted accordingly based on the user's acceptance or lack of acceptance to the proposed augmentation. For example, the weighted value of "Elvis Presley" and "hard to find" would be decreased if the user rejected the recommendation; whereas, the weighted value of "Elvis Presley" and "hard to find" would be increased if the user accepted the recommendation.

Referring back to step 701, if query analyzer 202 does not augment the query to include one or more terms of interest, then, in step 705, a determination is made by analyzer 104 as to whether content analyzer 201 proposes tags to be applied to content searched or published by the user as discussed above in connection with FIG. 6.

If content analyzer 201 has not proposed any tags to be applied to content searched or published by the user, then a determination is made by analyzer 104 if analyzer 104 augments the query to include one or more terms of interest in step 701.

If, however, content analyzer 201 proposed a tag to be applied to content searched or published by the user, then, in step 706, a determination is made as to whether the user accepted the proposed tag to be applied to the content searched or published by the user.

If the user does not accept applying the tag to the content searched or published by the user, then, in step 707, analyzer 104 adjusts the weighted value assigned to the tag (term of interest) by reducing the weighted value.

If, however, the user accepted applying the tag to the content searched or published by the user, then, in step 708, analyzer 104 adjusts the weighted value assigned to the tag (term of interest) by increasing the weighted value.

For example, the user of computing device 101 may publish an inventory of plates on a network. After analyzing such content and determining that such content relates to plates using natural language processing, content analyzer 201 analyzes the tags stored in user repository 106 to determine that the user has an interest in Elvis Presley memorabilia. Content analyzer 201 may then propose tagging such published plates with the tag of "Elvis Presley," since "Elvis Presley plates" has been found to be semantically related. That is, the tag of "Elvis Presley" may be proposed to be tagged to the term "plate" due to the weighted value assigned to "Elvis Presley" in connection with the term "plate" exceeding a threshold value. After recommending such proposed tagging to the user, the user may respond accordingly (e.g., accept or reject proposed tagging), which content analyzer 201 then uses such feedback to adjust the weighted value of "Elvis Presley." For example, the weighted value of "Elvis Presley" would be decreased if the user rejected the proposed tagging; whereas, the weighted value of "Elvis Presley" would be increased if the user accepted the proposed tagging.

In the manner discussed above, the embodiments of the present invention are able to provide the means for enabling users to conduct a search for locating content not previously contemplated or known to the user.

Furthermore, the present invention improves the technology or technical field involving search queries. As discussed above, search queries, such as database queries and web search queries, involve the task of searching content. For example, a database is an organized collection of data, generally stored and accessed electronically from a computer system, such as via a search query. In another example, a web search query is a query based on a specific search term that a user enters into a web search engine to satisfy his or her information needs. However, in conducting a content search, there are times that the user may not know of existing content that may be of interest to the user. As a result, the user would not be able to conduct a search for such content since the user has no knowledge of such content. For example, the user may collect Star Wars® comic books and may not be aware of the 0.350 variant edition of the first issue of the 1977 Star Wars® comic book. As the user is a collector of Star Wars® comic books, the user may be very interested in searching for content concerning such a variant edition of the Star Wars® comic books. However, the user would not be able to conduct such a search since the user has no knowledge of such a variant comic edition. As a result, there is not currently a means for effectively searching for content of interest to the user not previously known to the user.

The present invention improves such technology by storing content tags and query tags in a central repository and in a user repository, where the content tags are keywords or terms used to describe the analyzed content and query tags are keywords or tags used to described the analyzed queries. The central repository is used to store the content tags and query tags involving content searched or published and queries issued by all users; whereas, the user repository is only used to store the content tags and query tags involving content searched or published and queries issued by that particular user. By linking the central and user repositories and determining the user's interests, the system is able to augment queries to include terms of interest (tags) that the user may not have previously contemplated or known. As a result, the user is able to search for content that was not previously contemplated or known to the user but that may be of great interest to the user. Consequently, the present invention enables the user to locate content not previously contemplated or known to the user. In this manner, there is an improvement in the technical field involving search queries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving query searches, the method comprising:
    monitoring and identifying queries issued as well as content searched and published on a network by users of computing devices;
    analyzing said content to generate content tags, wherein said content tags are keywords or terms used to describe said analyzed content;

analyzing said queries to generate query tags, wherein said query tags are keywords or terms used to describe said analyzed queries;

storing said query tags and content tags in a central repository;

receiving a query to conduct a content search;

analyzing said query for semantic meaning;

identifying a group of query tags and content tags in said central repository that is most semantically similar in meaning to said semantic meaning of said query;

analyzing content tags and query tags in a user repository to determine interests of a user, wherein said user repository stores query tags and content tags based on analyzing queries issued and content of inventories searched and published on said network by said user; and augmenting said query to include additional one or more other terms of interest that match said determined interests of said user within a threshold degree of relatedness, wherein said one or more other terms of interest comprise query tags and/or content tags from said identified group of query tags and content tags based on their assigned weight.

2. The method as recited in claim 1 further comprising:

recommending said augmented query to said user to be used by said user to conduct said content search;

receiving a response from said user regarding said recommendation; and adjusting a weight assigned to said one or more other terms of interest in response to said user response.

3. The method as recited in claim 1 further comprising:

identifying content searched and published on said network by said user; analyzing said content for semantic meaning;

identifying a group of query tags and content tags in said central repository that is most semantically similar in meaning to said semantic meaning of said content;

tagging said analyzed content with a first term of interest that matches said determined interests of said user within said threshold degree of relatedness, wherein said first term of interest corresponds to a tag within said identified group of query tags and content tags in said central repository;

recommending to said user to tag said analyzed content with said first term of interest;

receiving a response from said user regarding said recommendation; and adjusting a weight assigned to said first term of interest in response to said user response.

4. The method as recited in claim 1, wherein said one or more other terms of interest comprise one or more content tags and query tags with a weighting that exceeds a threshold value.

5. The method as recited in claim 1 further comprising:

generating keys to identify storage locations of said analyzed content;

storing said generated keys in said central repository; and obtaining content requested in said query using one or more keys associated with content tags in said identified group of query tags and content tags in said central repository.

6. The method as recited in claim 1, wherein said queries comprise text queries, video queries and natural language queries.

7. The method as recited in claim 1, wherein said content comprises images, photographs, videos and web content.

8. A computer program product for improving query searches, the computer program product comprising a computer readable storage medium having program code embodied therewith, the program code comprising programming instructions for:

monitoring and identifying queries issued as well as content searched and published on a network by users of computing devices;

analyzing said content to generate content tags, wherein said content tags are keywords or terms used to describe said analyzed content;

analyzing said queries to generate query tags, wherein said query tags are keywords or terms used to describe said analyzed queries;

storing said query tags and content tags in a central repository;

receiving a query to conduct a content search;

analyzing said query for semantic meaning;

identifying a group of query tags and content tags in said central repository that is most semantically similar in meaning to said semantic meaning of said query;

analyzing content tags and query tags in a user repository to determine interests of a user, wherein said user repository stores query tags and content tags based on analyzing queries issued and content of inventories searched and published on said network by said user; and augmenting said query to include additional one or more other terms of interest that match said determined interests of said user within a threshold degree of relatedness, wherein said one or more other terms of interest comprise query tags and/or content tags from said identified group of query tags and content tags based on their assigned weight.

9. The computer program product as recited in claim 8, wherein the program code further comprises the programming instructions for:

recommending said augmented query to said user to be used by said user to conduct said content search;

receiving a response from said user regarding said recommendation; and adjusting a weight assigned to said one or more other terms of interest in response to said user response.

10. The computer program product as recited in claim 8, wherein the program code further comprises the programming instructions for:

identifying content searched and published on said network by said user; analyzing said content for semantic meaning;

identifying a group of query tags and content tags in said central repository that is most semantically similar in meaning to said semantic meaning of said content;

tagging said analyzed content with a first term of interest that matches said determined interests of said user within said threshold degree of relatedness, wherein said first term of interest corresponds to a tag within said identified group of query tags and content tags in said central repository;

recommending to said user to tag said analyzed content with said first term of interest;

receiving a response from said user regarding said recommendation; and adjusting a weight assigned to said first term of interest in response to said user response.

11. The computer program product as recited in claim 8, wherein said one or more other terms of interest comprise one or more content tags and query tags with a weighting that exceeds a threshold value.

12. The computer program product as recited in claim 8, wherein the program code further comprises the programming instructions for:
   generating keys to identify storage locations of said analyzed content;
   storing said generated keys in said central repository; and
   obtaining content requested in said query using one or more keys associated with content tags in said identified group of query tags and content tags in said central repository.

13. The computer program product as recited in claim 8, wherein said queries comprise text queries, video queries and natural language queries.

14. The computer program product as recited in claim 8, wherein said content comprises images, photographs, videos and web content.

15. A system, comprising:
   a memory for storing a computer program for improving query searches; and
   a processor connected to said memory, wherein said processor is configured to execute the program instructions of the computer program comprising:
      monitoring and identifying queries issued as well as content searched and published on a network by users of computing devices;
      analyzing said content to generate content tags, wherein said content tags are keywords or terms used to describe said analyzed content;
      analyzing said queries to generate query tags, wherein said query tags are keywords or terms used to describe said analyzed queries;
      storing said query tags and content tags in a central repository;
      receiving a query to conduct a content search;
      analyzing said query for semantic meaning;
      identifying a group of query tags and content tags in said central repository that is most semantically similar in meaning to said semantic meaning of said query;
      analyzing content tags and query tags in a user repository to determine interests of a user, wherein said user repository stores query tags and content tags based on analyzing queries issued and content of inventories searched and published on said network by said user; and
      augmenting said query to include additional one or more other terms of interest that match said determined interests of said user within a threshold degree of relatedness, wherein said one or more other terms of interest comprise query tags and/or content tags from said identified group of query tags and content tags based on their assigned weight.

16. The system as recited in claim 15, wherein the program instructions of the computer program further comprise:
   recommending said augmented query to said user to be used by said user to conduct said content search;
   receiving a response from said user regarding said recommendation; and
   adjusting a weight assigned to said one or more other terms of interest in response to said user response.

17. The system as recited in claim 15, wherein the program instructions of the computer program further comprise:
   identifying content searched and published on said network by said user; analyzing said content for semantic meaning;
   identifying a group of query tags and content tags in said central repository that is most semantically similar in meaning to said semantic meaning of said content;
   tagging said analyzed content with a first term of interest that matches said determined interests of said user within said threshold degree of relatedness, wherein said first term of interest corresponds to a tag within said identified group of query tags and content tags in said central repository;
   recommending to said user to tag said analyzed content with said first term of interest;
   receiving a response from said user regarding said recommendation; and
   adjusting a weight assigned to said first term of interest in response to said user response.

18. The system as recited in claim 15, wherein said one or more other terms of interest comprise one or more content tags and query tags with a weighting that exceeds a threshold value.

19. The system as recited in claim 15, wherein the program instructions of the computer program further comprise:
   generating keys to identify storage locations of said analyzed content;
   storing said generated keys in said central repository; and
   obtaining content requested in said query using one or more keys associated with content tags in said identified group of query tags and content tags in said central repository.

20. The system as recited in claim 15, wherein said queries comprise text queries, video queries and natural language queries.

* * * * *